Aug. 27, 1968    G. REMMERS ET AL    3,399,007
SPIRAL GROOVE BEARING

Filed July 12, 1966    2 Sheets-Sheet 1

INVENTORS
GERRIT REMMERS
HENRI TEPE
BY

AGENT

United States Patent Office 3,399,007
Patented Aug. 27, 1968

3,399,007
SPIRAL GROOVE BEARING
Gerrit Remmers, Eindhoven, and Henri Tepe, Drachten, Netherlands, assignors to North American Philips Company, Inc., New York, N.Y., a corporation of Delaware
Filed July 12, 1966, Ser. No. 564,634
Claims priority, application Netherlands, July 16, 1965, 6509207
4 Claims. (Cl. 308—172)

ABSTRACT OF THE DISCLOSURE

A spiral groove axial bearing for a rotatable shaft comprising a supporting member movably held in a base member and a plate member attached to the supporting member and being provided on its exposed surface with a plurality of radially arranged shallow uninterrupted grooves. The plate may be held to the supporting member by tags formed at the periphery of the plate or may be welded, soldered or glued into position.

---

This invention relates to a spiral groove bearing known from U.S. Patents 3,154,353 and 3,207,563.

Heretofore, the spiral grooves of these bearings have been machined by a milling operation or a thin sheet or plate was etched with the groove pattern extending completely through it by a known photoetching technique and this sheet attached to a bearing member by adhesive or solder. Obviously, forming the grooves by milling is expensive and time consuming. The known etching technique has a number of disadvantages also, for example the solder or adhesive cannot be kept from filling the groove and the sheet often warps during attachment to the bearing.

The object of this invention is to provide a spiral groove axial bearing which is economically manufactured.

The above and other features, objects and advantages of the present invention will be fully understood from the following description considered in connection with the accompanying illustrative drawings.

The invention will be described more fully with reference to an embodiment shown in the drawing.

Figure 1:
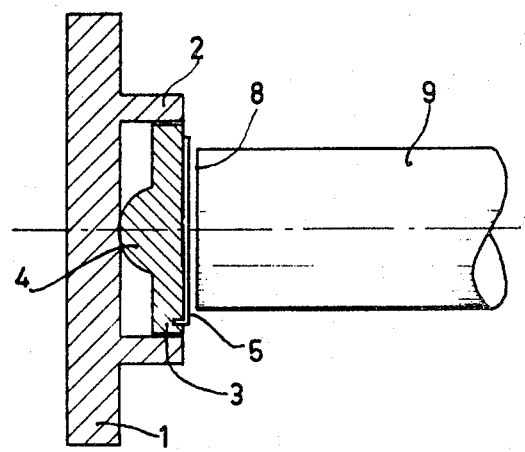
FIG. 1 is a sectional view of the bearing.

The bearing shown in FIG. 1 comprises a base member 1, provided with four lugs 2, two of which are shown in the sectional view. A bearing support member 3, of square shape, is arranged between the lugs 2. The supporting member 3 has a rounded extension 4 between the lugs 2 engaging the base member 1 so that the bearing can adjust itself automatically. The lugs 2 also prevent the supporting member 3 from rotating.

Figure 2:
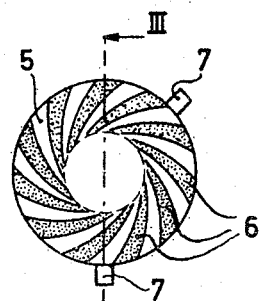
FIG. 2 is an elevation of the plate with the grooves.
Figure 3:
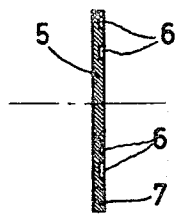
FIG. 3 is a sectional view taken on the line III—III in FIG. 2.

The supporting member 3 carries a plate 5, the shape of which is shown in FIGS. 2 and 3. The plate 5 is preferably circular and has shallow spiral grooves 6 embedded in one surface. For a plate having a diameter for example 20 mm., the depth of the grooves 6 is about 20 microns.

The thickness of plate itself in the above example is 100 microns. The grooves are provided by etching but do not penetrate through the plate. The plate has two tags 7 which form an angle of 120°. These two tags are bent over and sealed in a supporting member 3 which may be of a synthetic resin. It has been found that the plate 5 can be secured to the supporting member 3 so as to be free of stress and deformation (or warp) by means of the two-tag connection.

A second bearing part comprises a rotatable pressure member, which is shown in the drawing by the flat end 8 of a shaft 9. When the shaft 9 is rotating in the required direction, lubricant is urged by the grooves radially inwardly so that hydro-dynamic lubrication is produced and the known high load capacity of spiral groove bearings is obtained. The plate 5, which is preferably fastened to the support 3 by only two tags, is held flat by the shaft 9 against the supporting member 3 when not rotating. The friction moment between the plate 5 and the supporting member 3 is much greater than the friction moment between the end 8 of the shaft and the grooves 6 when rotation takes place so that the two-tag connection is sufficient.

The plate 5 may, as an alternative, be fastened by means of glue or solder, in which case the tags 7 may be omitted. The plate 5, furthermore, may be secured, without deformation, by means of tags 7 to a metal supporting member 3 by spot welding. The plate 5 may also be secured to the pressure member 8 instead of to the supporting member 3 without the same effect.

The lubricant is preferably grease so that post-lubrication is not required. When the shaft 9 stands still, the grease is accumulated at the peripheral edges of the grooves. Upon rotation of the shaft 9, the grooves force the grease into the interior of the bearing, while a hydro-dynamic lubricating film is formed. Lubrication by other lubricants is, of course, also possible.

Figure 4:
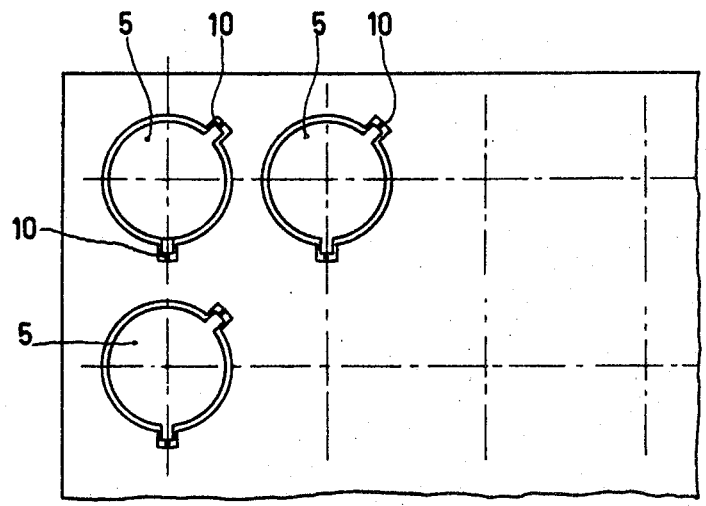
FIGS. 4 and 5 show various stages of the manufacture of the plate.
Figure 5:
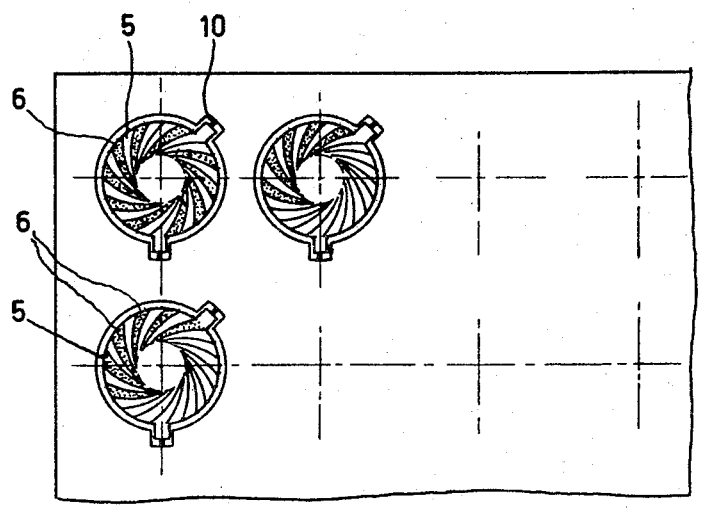

The bearings according to the invention can be manufactured in manner suitable for mass production by means of a photo-chemical etching process. A great number of plates 5 can be simultaneously made from a metal sheet of the desired thickness, for example 100 microns, as stated above. For this purpose the metal sheet is coated with a light-sensitive lacquer layer, a photo-resist being then applied to the sheet, said resist having the pattern of the circumference of the plates to be made (FIG. 4). After the exposure of the lacquer layer to light rays, the photo-resist is removed and the metal sheet is subjected to the action of an etchant. The peripheral outline of all plates 5 is simultaneously etched completely through the metal sheet but for a few bridges 10 (see FIG. 4). Subsequently, the remaining part of the lacquer layer serving for protection during the first etching process is removed and the sheet is again coated with a light-sensitive lacquer layer. Now a photo-resist having a groove pattern for each plate is then applied to the metal sheet (FIG. 5) and all plates are again exposed simultaneously. The metal sheet is again subjected to the action of an etchant until the groove pattern of the desired depth is obtained. After the removal of the remaining protective lacquer layer, the sheet contains a large number of finished plates 5 (see FIG. 5), which can be simply cut from the sheet at the places 10 and be secured to a bearing member. The photo-resist may be formed by a photographic negative or positive mask in accordance with the light-sensitive lacquer employed.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed as new and useful and secured by Letters Patent of the United States is:

1. An axial bearing assembly comprising a rotatable shaft member, a base element, a supporting member movably held by said base element, each of said members having opposed surfaces, a plate member attached to one of said members on the corresponding surface thereof, said plate member having a thickness of the order of 100 microns and comprising a plurality of radially arranged shallow uninterrupted grooves in the exposed surface thereof, the center line of each of said grooves forming a spiral, and the depth of said grooves extending into the exposed surface of said plate a distance less than the thickness thereof.

2. An axial bearing according to claim 1 wherein said plate member has at least one pair of tags projecting radially outwardly therefrom, said plate being secured to said one of said members by said tags.

3. An axial bearing assembly as claimed in claim 1 wherein said plate member is fixedly secured on the surface of said supporting member and is movable therewith relative to said base element.

4. An axial bearing assembly as claimed in claim 1 wherein said plate member comprises a body portion and a plurality of tags projecting radially from the periphery of said body portion at spaced intervals, wherein said plate member is positioned on the surface of said supporting member, and wherein said tags are welded to said supporting member thereby securing said plate member in position.

References Cited
UNITED STATES PATENTS

| | | | |
|---|---|---|---|
| 1,426,715 | 8/1922 | Cramer | 308—165 |
| 3,063,041 | 11/1962 | Quade et al. | 308—9 |
| 3,207,563 | 9/1965 | Muijderman | 308—172 |
| 3,328,094 | 6/1967 | Muijderman | 308—9 |

FOREIGN PATENTS

| | | |
|---|---|---|
| 102,722 | 11/1917 | Great Britain. |
| 723,194 | 2/1955 | Great Britain. |

MARTIN P. SCHWADRON, *Primary Examiner.*

FRANK SUSKO, *Assistant Examiner.*